United States Patent [19]

Kleinke et al.

[11] Patent Number: 5,231,148

[45] Date of Patent: Jul. 27, 1993

[54] MIXTURE OF PREDOMINANTLY ONE POLYHYDROXYALKANOATE AND A COMPOUND WHICH CONTAINS AT LEAST TWO REACTIVE GROUPS, SUCH AS ACID AND/OR ALCOHOL GROUPS, AND A POLYMER PREPARED BY MELTING THE MIXTURE

[75] Inventors: Andreas Kleinke; Karl-Heinz Reichert; Roman Bradel, all of Berlin, Fed. Rep. of Germany

[73] Assignee: PCD Polymere Gesellschaft m.b.H., Schwechat-Mannsworth, Austria

[21] Appl. No.: 794,057

[22] Filed: Nov. 19, 1991

[30] Foreign Application Priority Data

Dec. 19, 1990 [AT] Austria ............................ 2583/90

[51] Int. Cl.⁵ .......................... C08L 67/04; C12P 7/42
[52] U.S. Cl. .................................. 525/450; 435/146; 525/415
[58] Field of Search .................. 525/415, 450; 435/146

[56] References Cited

U.S. PATENT DOCUMENTS 3,182,036 5/1965 Baptist et al.
4,786,598 11/1988 Lafferty et al.
4,957,861 9/1990 Lafferty et al.

FOREIGN PATENT DOCUMENTS 052460 10/1981 European Pat. Off.
052946 10/1981 European Pat. Off.
069497  6/1982 European Pat. Off.
400855  5/1990 European Pat. Off.
3442176  5/1986 Fed. Rep. of Germany.

OTHER PUBLICATIONS

Bartnig et al., Prufung hochpolymerer Werkstoffe, Grundlagen und Prufmethoden, Carl Hanser Verlag, Munich-Vienna (1977).
MacKenzie et al., Differential Thermal Analysis, Academic Press, vol. 1, 1970 and vol. 2, 1972.

*Primary Examiner*—John Kight, III
*Assistant Examiner*—Shelley A. Dodson
*Attorney, Agent, or Firm*—Wenderoth, Lind & Ponack

[57] ABSTRACT

Mixture containing at least 70% by weight of polyhydroxyalkanoate and one or more compounds which contain reactive alcohol and/or acid groups, mixtures of poly-D (-)-3-hydroxybutyric acid with a polyether being excluded, process for the preparation of a polymer by melting the above mixture and a polymer in which at least some of the acid and/or alcohol groups of the polyhydroxyalkanoate are bonded via ester bonds to alcohol and/or acid groups of the admixed compound.

8 Claims, No Drawings

MIXTURE OF PREDOMINANTLY ONE POLYHYDROXYALKANOATE AND A COMPOUND WHICH CONTAINS AT LEAST TWO REACTIVE GROUPS, SUCH AS ACID AND/OR ALCOHOL GROUPS, AND A POLYMER PREPARED BY MELTING THE MIXTURE

The invention relates to a mixture containing at least 70% by weight o a polyhydroxyalkanoate and a compound or a mixture of compounds which contain at least two reactive groups, such as acid and/or alcohol groups, which can form ester bonds with at least some of the hydroxyl and/or acid groups of the polyhydroxyalkanoate on melting.

Polyhydroxyalkanoates are built up inside the cell of many microorganisms as storage substances for energy and carbon and have the great advantage that they are biologically degradable, Polyhydroxyalkanoates a thermoplastic polyesters which can be processed to shape articles. Nevertheless, their processing presents difficulties, since firstly they have poor mechanical properties, and secondly they are severely degraded on melting, with discoloration, the melt suffering a large drop in viscosity and then becoming difficult to process.

To improve the mechanical properties, U.S. Pat. No. 3,182,036 has proposed addition of certain plasticizers, in particular certain esters, polyesters, polyethers, chlorinated polyphenols or cyano compounds, to a polyhydroxybutyric acid, mixtures containing 25 to 54% by weight of plasticizer being formed. When such mixtures are melted, however, the viscosity of the melt is so low that they can be processed only with great difficulty, if at all. Furthermore, such mixtures crystallize very slowly, so that the cycle times, for example during melt casting, become very long. According to EP-A-0 052 40, an improvement in the mechanical properties of polyhydroxyalkanoates occurs if homo- or copolymers of D (-)-3-hydroxybutyric acid are mixed with an organic polymer which contains at least 25% by weight of chlorine or nitrile groups.

To increase the melt stability, EP-A-0 052 946 proposes addition of a compound having at least 2 carbon-carbon double bonds and a free radical initiator to the polyhydroxyalkanoate.

It has now been found, unexpectedly, that mixtures of polyhydroxyalkanoate with compounds which contain acid and/or alcohol groups have an excellent melt stability, the viscosity of the melt increasing in comparison with pure polyhydroxyalkanoate melts and at the same time the mechanical properties of the polymer formed after melting of the mixtures being better than those of the pure polyhydroxyalkanoate.

The invention therefore relates to a mixture which is characterized in that it contains at least 70by weight of polyhydroxyalkanoate and a compound or a mixture of compounds which contain at least two reactive groups, such as acid and/or alcohol groups, which can form ester bonds with free hydroxyl and/or acid groups of the polyhydroxyalkanoate on melting, mixtures of poly-D-(-)-3-hydroxybutyric acid with a polyester being excluded.

By polyhydroxyalkanoate there are to be understood, in particular, poly-D(-)-3-hydroxybutyric acid, and furthermore copolyesters thereof with 3-hydroxyvaleric acid and other hydroxy acids, as well as homo- or copolyesters of other hydroxy acids and mixtures of such polyesters.

The preparation of polyhydroxyalkanoate with the aid of microorganisms is described, for example, in U.S. Pat. No. 4,786,598 or EP-A-0 069 497.

According to the invention, the polyhydroxyalkanoates are present in a mixture with a compound or with a mixture of compounds which contain at least two reactive groups, such as acid and/or alcohol groups, mixtures of poly-D (-)-3-hydroxybutyric acid with a polyether being excluded. The mixture according to the invention contains at least 70% by weight of polyhydroxyalkanoate here.

By compounds which contain reactive acid groups there are to be understood inorganic, polybasic acids, such as boric acid, or organic acids, such as alkane-, aryl- or alkylarylcarboxylic acids having at least two, preferably having two, acid groups and at least 5, preferably having 8 to 20, particularly preferably having 8 to 16, C atoms, or corresponding hydroxycarboxylic acids having two or more hydroxyl or acid groups, as well as polymers which have a large number of free acid groups, in particular in a regular arrangement. Examples of such acids are, for instance, glutaric acid, adipic acid, sebacic acid, decanedicarboxylic acid, phthalic acid, isophthalic acid, terephthalic acid, trimellitic acid, hemimellitic acid, trimesic acid, phenylenediacetic acid, 3-hydroxydecanoic acid, 11-hydroxyundecanoic acid, polyacrylic acid and polymethacrylic acid. Boric acid and decanedicarboxylic acid are particularly preferred.

By compounds which contain reactive alcohol groups there are to be understood diols or polyols or polyethers having terminal free hydroxyl groups. Diols are those having at least 5, preferably having 8 to 20, particularly preferably having 8 to 16, C atoms. Examples of diols are the diols corresponding to the above-mentioned dicarboxylic acids, diols having at least 8 C atoms, in particular decanediol, being preferred. By polyols there are to be understood compounds having at least 5 C atoms and more than 2 hydroxyl groups, for example hexanetriols, decanetriols or polymeric alcohols, such as polyvinyl alcohol or modified polyvinyl alcohols, in particular Mowiols from Hoechst, especially Mowiol M1 04.86, Hoechst, and by polyethers there are to be understood those having terminal free hydroxyl groups, for example polyethylene oxide, polypropylene oxide, polyethylene glycol or polymethylene glycol, preferably polyethylene glycol.

Mixtures which contain at least 70% by weight of polyhydroxyalkanoate and a compound such as boric acid, a carboxylic acid having at least 5 C atoms and at least two acid groups, a hydroxycarboxylic acid having at least 5 C atoms, a diol having at least 5 C atoms or a polyol, a polyether or a mixture of such compounds, are preferred here.

Mixtures which contain at least 70% by weight of polyhydroxyalkanoate and a compound such as boric acid, a dicarboxylic acid having 8 to 16 C atoms, a diol having 8 to 16 C atoms, a polyether or mixtures of such compounds are particularly preferred.

Mixtures in which the polyhydroxyalkanoate is a homo- or copolymer of poly-D (-)-3-hydroxybutyric acid are especially preferred.

The compounds added must either melt or soften and/or dissolve in the polyhydroxyalkanoate melt and-/or be miscible with this melt at the melting temperature of the polyhydroxyalkanoate. A polyvinyl alcohol which does not yet soften at the melting temperature of the polyhydroxyalkanoate can be plasticized in the customary manner by addition of plasticizers. Plasticizers which can be employed are, for example, polyhydric alcohols, for example glycerol, trimethylpropane, neopentylglycol or other polyhydric alcohols. A polyvinyl alcohol plasticized in this manner is miscible with the polyhydroxyalkanoate in the melt.

The mixture according to the invention can furthermore contain plasticizers and/or nucleating agents and/or other additives customary in polymer chemistry.

Plasticizers which are employed are the plasticizers customary in polymer chemistry, preferably p-toluenesulphonamide and glycerol triacetate. It has been found, surprisingly, that after the mixtures have melted, the plasticizer is taken up and held particularly well by the polymer formed. For this, mixtures consisting of polyhydroxyalkanoate and a plasticizer and those of polyhydroxyalkanoate, boric acid and a plasticizer are prepared and melted. Films have been produced from the melts. The films produced from the mixtures according to the invention remained clear and stable, while films of polyhydroxyalkanoate and plasticizer alone became cloudy after only a short time, since the plasticizer diffused out of the film. It has furthermore been fond that the viscosity and rate of crystallization of a melt of a plasticizer-containing mixture according to the invention were higher than in the case of a melt which consisted only of polyhydroxyalkanoate and a plasticizer alone.

Nucleating agents which are used are the nucleating agents customary in polymer chemistry, such as boron nitride and pyrogenic silicic acid, for example Aerosils, in particular Aerosil R 974 from Degussa, especially preferably boron nitride.

The expert is familiar with other additives which are customary in polymer chemistry and can be present in the mixture according to the invention. Such agents are usually added to fulfil a specific purpose. These include, for example, fillers, pigments and antioxidants.

The mixture according to the invention contains at least 70% by weight of polyhydroxyalkanoate and 0.1 to 10% by weight of a compound or a mixture of compounds which contain at least two reactive groups, such as acid and/or alcohol groups.

To prepare the mixture according to the invention, the starting substances are mixed. The starting substances can be mixed in solid form by intimate grinding, stirring or homogenizing, in solution or suspension by stirring, or partly in solid form and partly in solution or suspension by vigorous stirring and if appropriate evaporation of the solvent or diluent, it also being possible or the mixtures to be converted into granules with the aid of customary granulating processes.

On melting of the mixtures according to the invention, acid and/or alcohol groups of the polyhydroxyalkanoates react with alcohol and/or acid groups of the compounds added, ester bonds being formed. Not absolutely all of the reactive groups have to react here, and it is also possible for only some of the possible ester bonds to e formed. As a result of the reaction, either chain lengthening of the polyhydroxyalkanoates can occur, or branching or crosslinking of polyhydroxyalkanoate chains can also arise.

Polymer chains of the polyhydroxyalkanoate usually break apart on melting, so that new acid and hydroxyl groups become free and can likewise react, as described above, with the compounds added, so that in the end a polymer bonded via new ester bonds is formed. Thermal degradation of the polyhydroxyalkanoate is compensated in this manner and the mixture is stabilized to heat.

Such a polymer is new and the invention likewise relates to it.

A polymer which is likewise new and to which the invention relates is that formed by melting a mixture of poly-D(-)-3-hydroxybutyric acid with a polyether by reaction of the terminal free hydroxyl groups of the polyether with the acid groups of the poly-D(-)-3-hydroxybutyric acid. Although a mixture of a polyether with poly-D-(-)-3-hydroxybutyric acid is disclosed in U.S. Pat. No. 3,182,036, the mixtures described therein are not expressis verbis melted or reacted in another manner, so that no crosslinked polyhydroxyalkanoate can form in that case.

To prepare the polymer according to the invention, the mixtures described are heated to temperatures above the melting point of the polyhydroxyalkanoate, if appropriate while stirring, or the polyhydroxyalkanoate is heated by itself and one or more compounds having reactive hydroxyl and/or acid groups are added in the course of the heating and melting operation. Since the reaction proceeds exothermically and since the temperature of the melt can be increased by vigorous stirring, it should be ensured that no overheating occurs.

In a particular embodiment, the polyhydroxyalkanoate and one or more compounds having reactive hydroxyl and/or acid groups are introduced into a mixer which can be heated and are heated during the mixing operation. It has been fond that the use of shearing forces during melting accelerates the degradation of the polyhydroxyalkanoate, so that, depending on the shearing forces and the temperature, polymers having longer or shorter polyhydroxyalkanoate chains and bonded, branched or crosslinked with the compounds added which contain acid and/or alcohol groups are formed.

The polymer according to the invention is heat-stable on melting, and moreover has better mechanical properties and already crystallizes at higher temperatures than pure polyhydroxyalkanoate.

The comparison of standard shaped articles of polymer according to the invention and those of pure polyhydroxyalkanoate has thus shown that the mechanical properties of the polymer according to the invention are improved compared with those of a pure polyhydroxyalkanoate. Differential scanning calorimetry (DSC) measurements showed that the polymer prepared according to the invention already has its crystallization maximum at higher temperatures than pure polyhydroxyalkanoate.

In comparison experiments, it has furthermore been found that the biological degradability of the polyhydroxyalkanoates is retained.

The mixtures according to the invention are stable on storage and heat-stable during melting, a polymer which has a higher viscosity and better mechanical properties than those of the pure polyhydroxyalkanoate being formed on melting. The polymer according to the invention holds plasticizers better than pure polyhydroxyalkanoate, the melt containing plasticizer having a higher viscosity and crystallizing faster than a melt of polyhydroxyalkanoate and plasticizer alone, so that, for example, improved processing properties and shorter cycle times can be achieved during injection molding. The invention thus represents an enrichment of the art.

EXAMPLE 1

22.5 g of poly-D(-)-3-hydroxybutyric acid were mixed mechanically
  a) with 1.5 g of polyethylene glycol (molecular weight=200,000) (1a),
  b) with 1.5 g of polyethylene goucol (molecular weight=50,000) (1b) and
  c) with 0.99 g of Mowiol M1 04.86 (modified polyvinyl alcohol) from Hoechst (1c).

The mixtures were mixed intimately and heated to 180° C. with the aid of an electrically heated mixer at 30 revolutions per minute. After a mixing time of 10 minutes, the heating was switched off and the polyhydroxyalkanoate formed was cooled by means of compressed air, whereupon it crystallized out. The polyhydroxyalkanoate was then preheated for one minute with an electrically heated press at 180° C. and then pressed to sheets for 3 minutes under 200 bar, and the sheets were crystallized by cooling with water at a cooling rate of about 70° C. per minute. Test specimens having a clamping length of 29 mm, a total length of 70 mm and a thickness of 1 mm with a shoulder were stamped out of the plates.

Test specimens of poly-D(-)-3-hydroxybutyric (poly-HB) and test specimens of a copolymer of 3-hydroxybutyric acid (HB) and 3-hydroxyvaleric acid (HV), HB:BV=95:5, were produced in the same manner.

Using the test specimens produced in the manner described above, tensile tests were carried out at a traction rate of 50 mm/minute to determine the elongation at break epsilon (%) and the tensile stress sigma ($N/mm^2$).

This gave the following results summarized in Table 1:

TABLE 1

|         | Poly-HB | Poly-HB/HV | 1a   | 1b   | 1c   |
|---------|---------|------------|------|------|------|
| epsilon | 2.07    | 2.80       | 3.59 | 5.52 | 5.93 |
| sigma   | 2.68    | 2.75       | 2.83 | 3.36 | 3.85 |

The values show the improved mechanical properties of the polyhydroxyalkanoate according to the invention compared with poly-HB and poly-HB/HV.

EXAMPLE 2

In the manner described in Example 1, but with a mixing time of 2 minutes and a mixing and pressing temperature of 175° C., test specimens of poly-HB (V) and those of a mixture of 95.2% by weight of poly-HB, 0.4% by weight of boric acid, 0.4% by weight of boron nitride and 4% by weight of p-toluenesulphonamide (2(4%)) and a corresponding mixture without boric acid (2a(4%)) and corresponding mixtures with and without boric acid containing 11% by weight (2(11%) and 2a(11%)) and 20% of p-toluenesulphonamide (2(20%) and 2a(20%)) were produced and their torsional moment and mechanical properties were tested. The torsional moment D (NM) was measured in the mixer after a reaction time of 2 minutes and is a measure of the viscosity of the melt. This gave the following results summarized in Table 2:

TABLE 2

| Mixture | epsilon (%) | sigma ($N/mm^2$) | $a_n$ ($kJ/m^2$) | D (Nm) (175° C.) | $T_K$ (°C.) |
|---------|-------------|------------------|------------------|------------------|-------------|
| V       | 4.55        | 3.32             | 6.77             | 4.7              | 111.4       |
| 2a (4%) | 5.93        | 2.94             | 6.48             | 3.2              | 105.5       |
| 2 (4%)  | 9.65        | 3.78             | >39.24           | 5.8              | 109.6       |
| 2a (11%)| 6.21        | 2.28             | 7.75             | 2.9              | 95.1        |
| 2 (11%) | 9.93        | 2.80             | 13.44            | 4.8              | 99.8        |
| 2a (20%)| 3.86        | 1.47             | 4.32             | 2.2              | 83.1        |
| 2 (20%) | 10.89       | 2.40             | 11.77            | 3.8              | 87.4        | epsilon = elongation at break. sigma = tensile stress. $a_n$ = impact strength. D = torsional moment.

The values show that the mechanical properties and the viscosity of the molten mixture are improved by addition of boric acid, and that the mixtures according to the invention crystallize at higher temperatures than corresponding mixtures of polyhydroxyalkanoate and plasticizer.

EXAMPLE 3

In the manner described in Example 2, test specimens consisting of 99.2% by weight of poly-HB, 0.4% by weight of boric acid and 0.4% by weight of boron nitride were produced and their mechanical properties were tested and compared with those of poly-HB mixed with 0.4% by weight of boron nitride. This gave the following results summarized in Table 3:

TABLE 3

|                     | Poly-HB | 3     |
|---------------------|---------|-------|
| epsilon (%)         | 4.55    | 8.83  |
| sigma ($N/mm^2$)    | 3.32    | 4.41  |
| $a_n$ ($kJ/m^2$)    | 6.77    | 13.05 |

EXAMPLE 4 a) 95.6% by weight of poly-HB, 4by weight of Mowiol M1 04.86, Hoechst, and 0.4% by weight of boron nitride,
  b) 99.2% by weight of poly-HB, 0.4% by weight of boric acid and 0.4% by weight of boron nitride,
  c) 95.2% by weight of poly-HB, 0.4% by weight of boric acid, 4% by weight of Mowiol M1 04.86, Hoechst, and 0.4% by weight of boron nitride, and
  d) poly-HB and 0.4% by weight of boron nitride,
were mixed and homogenized in the dry state. These mixtures were characterized by differential scanning calorimetry (DSC) measurements under nitrogen. For this, in each case 4 to 6 mg were weighed out and a heating and cooling rate of 10° C./minute was established. Each mixture was subjected to in each case four heating operations at various holding temperatures (185°, 190°, 195°, 200°, 205°, 210° C.). A heating operation was carried out as follows: start temperature 10° C., heating up to the holding temperature, holding time 1 minute, cooling down to 10° C., holding time 1 minute, renewed heating up and so on. Each mixture was mixed again for each holding temperature during this procedure. The melt peak maximum (MM) was determined on heating up and the crystallization peak maximum (CM) was determined on cooling.

This gave the following results summarized in Table 4:

TABLE 4

| (SM = MM, KM = CM) | | | | | |
|--------|-------|-------|-------|-------|-------|
|        | 185/1 | 185/2 | 185/3 | 185/4 | (°C.) |
| 4a-MM  | 175,0 | 177,2 | 176,4 | 175,6 |       |
| 4a-CM  | 118,1 | 118,4 | 118,7 | 118,8 |       |

TABLE 4-continued (SM = MM, KM = CM)

| | | | | |
|---|---|---|---|---|
| 4b-MM | 173.9 | 176.6 | 175.9 | 175.3 |
| 4b-CM | 118.1 | 118.1 | 118.2 | 118.4 |
| 4c-MM | 174.4 | 176.4 | 175.6 | 174.9 |
| 4c-CM | 118.0 | 118.3 | 118.5 | 118.7 |
| 4d-MM | 174.4 | 174.5 | 174.9 | 174.3 |
| 4d-CM | 116.8 | 116.8 | 116.8 | 116.8 |

| | 190/1 | 190/2 | 190/3 | 190/4 | (°C.) |
|---|---|---|---|---|---|
| 4a-MM | 174.4 | 175.4 | 174.4 | 172.9 | |
| 4a-CM | 111.3 | 110.1 | 109.2 | 106.9 | |
| 4b-MM | 174.4 | 175.8 | 174.5 | 173.5 | |
| 4b-CM | 113.4 | 112.0 | 119.7 | 109.7 | |
| 4c-MM | 174.9 | 174.8 | 173.4 | 172.3 | |
| 4c-CM | 111.5 | 109.5 | 108.0 | 106.9 | |
| 4d-MM | 174.2 | 174.9 | 173.4 | 172.3 | |
| 4d-CM | 111.4 | 108.9 | 106.8 | 105.1 | |

| | 195/1 | 195/2 | 195/3 | 195/4 | (°C.) |
|---|---|---|---|---|---|
| 4a-MM | 174.8 | 173.7 | 172.1 | 170.8 | |
| 4a-CM | 106.8 | 104.1 | 102.8 | 101.9 | |
| 4b-MM | 174.0 | 174.6 | 172.9 | 171.7 | |
| 4b-CM | 111.6 | 107.5 | 104.8 | 103.7 | |
| 4c-MM | 174.6 | 173.4 | 171.6 | 170.1 | |
| 4c-CM | 107.0 | 103.9 | 102.3 | 101.3 | |
| 4d-MM | 173.8 | 173.9 | 171.2 | 169.6 | |
| 4d-CM | 105.4 | 98.1 | 89.1 | 83.1 | |

| | 200/1 | 200/2 | 200/3 | 200/4 | (°C.) |
|---|---|---|---|---|---|
| 4a-MM | 175.7 | 172.8 | 170.7 | 168.5 | |
| 4a-CM | 103.6 | 100.8 | 98.1 | 96.1 | |
| 4b-MM | 174.8 | 173.3 | 171.3 | 169.6 | |
| 4b-CM | 102.3 | 99.2 | 99.0 | 98.5 | |
| 4c-MM | 175.8 | 172.9 | 170.1 | 168.6 | |
| 4c-CM | 102.0 | 99.1 | 97.6 | 95.1 | |
| 4d-MM | 174.5 | 172.0 | 169.6 | 165.3 | |
| 4d-CM | 97.2 | 78.7 | 64.0 | 63.4 | |

| | 205/1 | 205/2 | 205/3 | 205/4 | (°C.) |
|---|---|---|---|---|---|
| 4a-MM | 174.7 | 171.1 | 167.6 | 164.7 | |
| 4a-CM | 99.5 | 94.0 | 91.0 | 88.6 | |
| 4b-MM | 174.7 | 172.5 | 170.0 | 165.5 | |
| 4b-CM | 100.8 | 99.0 | 98.0 | 96.4 | |
| 4c-MM | 174.6 | 171.3 | 168.0 | 165.5 | |
| 4c-CM | 98.4 | 94.5 | 92.5 | 89.3 | |
| 4d-MM | 174.4 | 169.9 | 165.0 | 161.0 | |
| 4d-CM | 64.2 | 60.6 | 60.3 | 60.4 | |

| | 210/1 | 210/2 | 210/3 | 210/4 | (°C.) |
|---|---|---|---|---|---|
| 4a-MM | 174.4 | 169.3 | 164.1 | 161.1 | |
| 4a-CM | 96.6 | 90.7 | 87.1 | 86.2 | |
| 4b-MM | 174.1 | 170.1 | 166.5 | 163.3 | |
| 4b-CM | 97.4 | 94.1 | 93.1 | 88.9 | |
| 4c-MM | 175.5 | 169.3 | 166.0 | 161.9 | |
| 4c-CM | 95.1 | 90.6 | 86.6 | 86.0 | |
| 4d-MM | 174.9 | 161.4 | 156.2 | 151.4 | |
| 4d-CM | 63.6 | 61.3 | 60.1 | 57.2 | |

The values measured show the improved heat stability compared with poly-HB and that the melts of the mixtures according to the invention already crystallize at higher temperatures.

EXAMPLE 5

Test specimens were produced from a) poly-HB and 0.2% by weight of boron nitride (5a), b) poly-HB, 0.2% by weight of boron nitride and 1.2% by weight of 1,10-decanedicarboxylic acid (5b) and c) poly-HB, 0.2% by weight of boron nitride, 1.2% by weight of 2,4-decanedicarboxylic acid and 0.4% by weight of boric acid (5c), as described in Example 2, and their mechanical properties and torsional moment D were tested and compared with those of poly-HB. This gave the following values summarized in Table 5:

TABLE 5

| | 5a | 5b | 5c |
|---|---|---|---|
| epsilon (%) | 5.93 | 8.41 | 8.27 |
| sigma (N/mm$^2$) | 4.95 | 5.05 | 5.09 |
| $a_n$ (kJ/m$^2$) | 6.08 | 14.62 | 11.97 |
| D (Nm, 175° C.) | 6.1 | 7.6 | 9.0 |

The values measured show the improved mechanical properties of the mixture according to the invention compared with poly-HB and the increase in the viscosity.

EXAMPLE 6

As described in Example 2, the mixtures a) 99.8% by weight of poly-HB and 0.2% by weight of boron nitride (6a), b) 97.8% by weight of poly-HB, 0.2% by weight of boron nitride and 2% by weight of 1,10-decanediol (6b) and c) 98.2% by weight of poly-HB, 0.2% by weight of boron nitride, 1.2% by weight of 1,10-decanediol and 0.4% by weight of boric acid (6c) were prepared. Test specimens were produced from the mixtures in the manner described in Example 2, and their mechanical properties and torsional moments were tested. This gave the following values summarized in Table 6:

TABLE 6

| | 6a | 6b | 6c |
|---|---|---|---|
| epsilon (%) | 5.93 | 7.59 | 8.27 |
| sigma (N/mm$^2$) | 4.95 | 4.96 | 5.11 |
| $a_n$ (kJ/m$^2$) | 6.08 | 11.77 | 15.50 |
| D (Nm, 175° C.) | 6.1 | 6.1 | 10.0 |

EXAMPLE 7

Mixtures were prepared as described in Example 2, but using mixtures consisting of 93.9% by weight of poly-HB, 0.1% by weight of boron nitride and 6% by weight of glycerol triacetate (7a(6%)) or from 93.5% by weight of poly-HB, 0.1% by weight of boron nitride, 0.4% by weight of boric acid and 6% by weight of glycerol triacetate (7(6%)). Corresponding mixtures with and without boric acid were also prepared using 11% by weight (7a(11%) and F7(11%)) and 20% by weight (7a(20%) and 7(20%)) of glycerol triacetate. Their mechanical properties, torsional moment and melting and crystallization temperatures were determined in the manner described in Examples 2 and 5. This gave the values summarized in Table 7:

TABLE 7

| Mixture | epsilon (%) | sigma (N/mm$^2$) | D (Nm) | $T_S$ (°C.) | $T_K$ (°C.) |
|---|---|---|---|---|---|
| 7a (6%) | 9.10 | 3.57 | 5.50 | 173.0 | 111.1 |
| 7 (6%) | 10.21 | 3.89 | 9.80 | 173.7 | 114.8 |
| 7a (11%) | 10.76 | 3.17 | 5.50 | 167.2 | 102.4 |
| 7 (11%) | 11.58 | 3.42 | 8.20 | 171.8 | 108.0 |
| 7a (20%) | 8.83 | 2.09 | 4.10 | 161.5 | 95.4 |
| 7 (20%) | 12.83 | 2.45 | 6.70 | 165.0 | 100.3 |

The impact strength $a_n$ reached values of >392 kJ/m$^2$ for all the specimens. The test specimens which contained no boric acid broke under further impacts with a hammer size of 40 kgcm. It was impossible to destroy the test specimens which contained boric acid in this way.

A Brabender twin-screw mixer W50, two zones, which could be heated electrically, was used to prepare the mixtures described in Examples 1 to 3 and 5 to 7.

The time taken to introduce the components into the mixer was about 45 seconds. A pressure ram was used for charging. The tensile tests and impact strength tests were carried out in accordance with the method of Bartnig et al., Prufung hochpolymerer Werkstoffe, Grundlagen und Prufmethoden (Testing of high-polymer materials, principles and test methods), Carl Hanser Verlag, Munich Vienna (1977) using an Instron tensile tester and pendulum hardness tester. The tensile tests were carried out as described in Example 1. For the impact strength tests, hammers having an impact force of 5, 10 and 40 kgcm were used. The test specimens used for determination of the impact strength had a length of 30 mm, a width of 10 mm, a thickness of 1 mm and a cross-sectional surface of 10 mm.

The DSC measurements were carried out with the aid of a Perkin-Elmer DSC 7 calorimeter, as described in Example 4. The principles of DSC measurements are to be found, for example, in MacKenzie et al., Differential Thermal Analysis, Academic Press, Volume 1, 1970 and Volume 2, 1972.

The torsional moment is a measure of the viscosity and was in each case determined as described i Example 2.

The poly-D(-)-3-hydroxybutyric acid used was prepared by the procedure described in U.S. Pat. No. 4,957,861. The boric acid used (98%) and the boron nitride used were obtained from Aldrich. The polyethers used originated from Serva.

We claim:

1. A mixture comprising at least 70% by weight of a polyhydroxyalkanoate and 0.1 to 10% by weight of a compound or a mixture of compounds which contain at least two acid and/or alcohol groups, which are melted or softened and/or dissolved in a melt of said polyhydroxyalkanoate and/or are miscible with the melt at the melting point of said polyhydroxyalkanoate, mixtures of poly-D (-)-3-hydroxybutyric acid with a polyether being excluded.

2. A mixture according to claim 1, comprising the compound containing acid and/or alcohol groups being boric acid, a carboxylic acid having at least 5 C atoms and at least two acid groups, a hydroxycarboxylic acid having at least 5 C atoms, a diol having at least 5 C atoms or a polyol, a polyether or a mixture of such compounds, mixtures or poly-D(-)-3-hydroxybutyric acid with a polyether being excluded.

3. A mixture according to claim 1 additionally comprising plasticizers and/or nucleating agents and/or other additives which are customary in polymer chemistry.

4. A mixture according to claim 1 comprising a homo- or copolymer of poly-D(-)-3-hydroxybutyric acid, boric acid or a mixture of boric acid with a dicarboxylic acid or a diol having at least 8 C atoms, with or without plasticizers, nucleating agents or other additives which are customarily used n polymer chemistry.

5. A polymer comprising at least some of the acid and/or alcohol groups of a polyhydroxyalkanoate being bonded via ester bonds to alcohol and/or acid groups of one or more compounds which contain at least two acid and/or alcohol groups, said compound or compounds being melted or softened and/or dissolved in a melt of said polyhydroxyalkanoate and which are miscible with the melt at the melting point of said polyhydroxyalkanoate, the polyhydroxyalkanoate content in the polymer being at least 70% by weight.

6. A polymer according to claim 5, comprising
at least some of the acid and/or alcohol groups of said polyhydroxyalkanoate being bonded via ester bonds t alcohol and/or acid groups of boric acid, a carboxylic acid having at least 5 C atoms and at least two acid groups, a hydroxycarboxylic acid having at least 5 C atoms, a diol having at least 5 C atoms or a polyol or a polyether.

7. A polymer according to claim 5, comprising, plasticizers nucleating agents and/or other additives which ar customarily used n polymer chemistry.

8. A process for the preparation of a polymer containing at least 70% by weight of polyhydroxyalkanoate comprising mixing and melting at least 70% by weight of a polyhydroxyalkanoate with 0.1 to 10% by weight of one or more compounds which contain at least two acid and/or alcohol groups and which melt or are softened and/or are dissolved in the polyhydroxyalkanoate melt and/or are miscible with this melt at the melting point of the polyhydroxyalkanoate and which are with or without plasticizers, nucleating agents or other additives which are customarily used in polymer chemistry whereby at least some acid and/or hydroxyl groups of the polyhydroxyalkanoate are bond via ester bonds to the alcohol and/or acid groups of the compound added and then cooling, to crystallize the polymer thus formed.

* * * * *